A. M. Allen,
Treadle.
No. 110,533. Patented Dec. 27, 1870.
Fig: 1
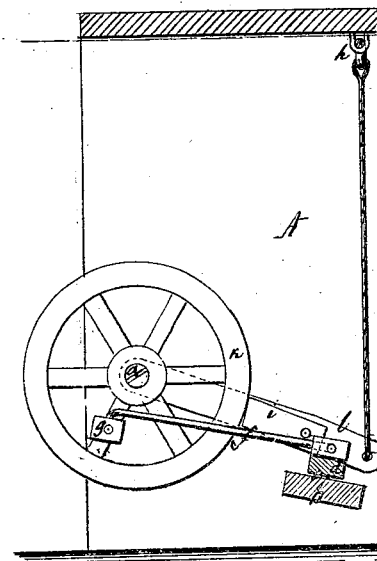
Fig: 2
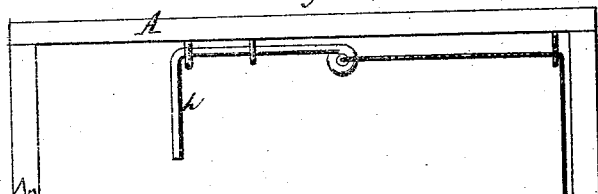
Fig: 3
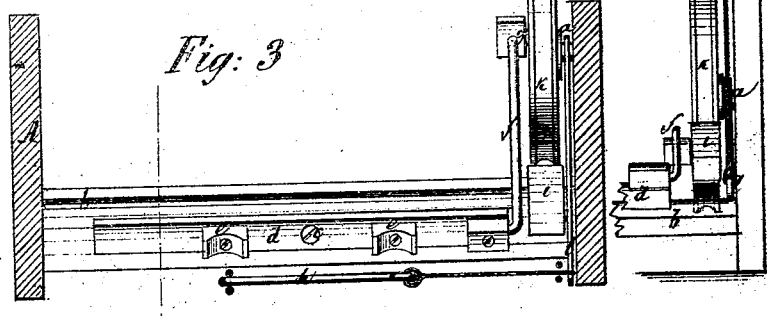
Witnesses:
C. Wahlers
E. F. Kastenhuber
Inventor:
A. M. Allen
Van Santvoord & Hauff
attys

United States Patent Office.

ARTHUR M. ALLEN, OF NEW YORK, N. Y.

Letters Patent No. 110,533; dated December 27, 1870.

IMPROVEMENT IN TREADLES.

The Schedule referred to in these Letters Patent and making part of the same.

*To all whom it may concern:*

Be it known that I, ARTHUR M. ALLEN, of the city, county, and State of New York, have invented a new and useful Improvement in Converting Motion; and I do hereby declare the following to be a full, clear, and exact description thereof, which will enable those skilled in the art to make and use the same, reference being had to the accompanying drawing forming part of this specification, in which drawing—

Figure 1 represents a sectional, plan, or top view of this invention.

Figure 2 is a front view; and

Figure 3 is a transverse vertical section of the same.

Similar letters indicate corresponding parts

This invention relates to a device for converting reciprocating alternating motion into continuous rotary motion, which consists principally of a vibrating bar connected on each side of its fulcrum to a pedal or handle, in combination with a crank, in such a manner that, by applying the feet or hands to the pedals or handles, and imparting to them a vibrating motion, the bar is caused to oscillate on its fulcrum, and a continuous revolving motion is thereby given to the crank.

The pedals or handles are so arranged that they receive an alternating motion toward and from the operator, and that their motion can be transmitted by means of a single crank to a wheel or shaft, imparting to said wheel or shaft a continuous revolving motion.

For the purpose of starting the crank in the right direction, a knee-bar is provided, which actuates a dog bearing on a wheel connected to said crank.

In the drawing—

The letter A designates a frame, which forms the bearings for the crank-shaft *a*.

In the bottom part of said frame is a traverse, *b*, from which rises a pin, *c*, forming the fulcrum for a bar, *d*, and this bar connects on each side of its fulcrum with a pedal, *e*, and said pedals being either directly connected to the vibrating-bar, as shown in the drawing, or attached to swinging levers, which connect with the vibrating-bar by suitable joints or rods.

If the vibrating bar is to be operated by the hands, the pedals are to be replaced by suitable handles.

One end of the vibrating-bar *d* connects by a rod, *f*, with the crank-pin *g*, and by placing the feet on the pedals, and imparting to the feet an alternating pushing motion, (the knees forming the fulcrums) a vibrating motion is imparted to the bar *d*, and the crank-shaft receives a continuous revolving motion.

Instead of connecting the vibrating-bar *d* directly to the crank-pin, it may be connected to one end or center of an intermediate lever, the other end or center of which connects with the crank-pin. Or, if a double crank-shaft is used, either end of the vibrating-bar may be made to connect with one of the cranks; but in practice I prefer the arrangement of a single crank-pin with the pedals alternating toward and from the operator.

The motion of the feet required to operate my treadle is similar to that of the feet in walking, the feet being caused to swing backward and forward from the knees, so that the operation of the treadle requires very little exertion, and is much less fatiguing than that of an ordinary treadle, where the motion of the feet takes place at the ankles alone.

A similar effect may also be produced by placing the pedals on slides, and connecting them to each other by cords, so that they have an alternating motion toward and from the operator, and that, by connecting one of the pedals with the crank, a revolving motion is imparted to the latter.

The vibrating-bar might also be divided in two, each half being made to swing on a pivot in one end, and carrying a pedal or handle on its opposite end, and the two pedals or handles would in this case be connected by an endless cord or otherwise, so as to compel them to alternate.

From this description it will be noticed that my invention is capable of being modified in various ways, and I do not wish to confine myself to the precise arrangement shown in the drawing.

From this drawing it will be seen that the connecting-rod *f* is double-jointed at each end, so as to be able to accommodate itself to the motions of the bar and of the crank. By placing the wheel parallel to or in the plane of vibration of the bar *d*, a rod with simple joints may be used.

With the crank-shaft I have combined a knee-bar, *h*, which connects by a cord or rod with a lever, *l*, carrying a dog, *i*, which bears against a wheel, *k*, mounted on the crank-shaft.

The lever *l* swings loosely on the crank-shaft, and the dog bears loosely against the wheel, so that, by raising the lever up in the direction of the arrow marked near it in fig. 2, the wheel is turned in the right direction, and at the same time the dog prevents the wheel being turned in the wrong direction.

The motion of the lever *l* is effected by pressing with the knee against the knee-bar, and by these means the operator is enabled to start the crank-shaft and to throw the same off its dead centers without being compelled to reach down with the hands.

It is obvious that the connection between the knee-bar and the dog can be effected in many different ways, and I do not wish to confine myself to the precise arrangement shown in the drawing.

What I claim as new, and desire to secure by Letters Patent, is—

1. The vibrating bar $d$, connected on each side of its fulcrum to a pedal, in combination with a crank, to which a revolving motion is to be imparted, substantially as described.

2. The centrally-pivoted pedals, having an alternating motion toward and from the operator, in combination with a single crank, substantially as herein set forth.

3. The knee-bar $h$, in combination with a dog acting on the wheel, for the purpose of starting the same in the right direction, substantially as described.

ARTHUR M. ALLEN.

Witnesses:
W. HAUFF,
E. F. KASTENHUBER.